(12) United States Patent
Heinrich et al.

(10) Patent No.: US 6,758,775 B2
(45) Date of Patent: Jul. 6, 2004

(54) BEVEL GEAR UNIT

(75) Inventors: Johannes Heinrich, Friedrichsdorf/Ts. (DE); Gert Schönnenbeck, Neu-Anspach (DE); Peter Wagner, Biebertal (DE); Rainer Matzig, Konigstein (DE)

(73) Assignee: P.I.V. Antrieb Werner Reimers GmbH & Co. KG, Hamburg (DE)

( * ) Notice: Subject to any disclaimer, the term of this patent is extended or adjusted under 35 U.S.C. 154(b) by 0 days.

(21) Appl. No.: 09/988,829

(22) Filed: Nov. 20, 2001

(65) Prior Publication Data
US 2002/0065157 A1 May 30, 2002

(30) Foreign Application Priority Data
Nov. 24, 2000 (DE) .......................... 100 58 475

(51) Int. Cl.[7] .............................. F16H 61/00

(52) U.S. Cl. .......................... 474/19; 474/17

(58) Field of Search ............... 474/17, 19, 8, 474/10, 25

(56) References Cited

U.S. PATENT DOCUMENTS

| | | | |
|---|---|---|---|
| 3,722,308 A | | 3/1973 | Steuer |
| 4,016,771 A | * | 4/1977 | Berens et al. .............. 474/19 |

FOREIGN PATENT DOCUMENTS

| | | | | |
|---|---|---|---|---|
| DE | 2 016 181 | | 4/1970 | |
| DE | 20 58 399 | | 6/1972 | |
| DE | 3403704 | * | 9/1984 | ........... F16H/61/00 |
| DE | 43 00 879 | | 7/1994 | |
| EP | 0097986 | * | 1/1984 | ................ 474/19 |
| JP | 63009767 | | 1/1988 | |
| WO | WO 99 54647 | | 10/1999 | |

* cited by examiner

Primary Examiner—David A. Bucci
Assistant Examiner—Vicky A. Johnson
(74) Attorney, Agent, or Firm—Venable LLP; Robert Kinberg; Chad C. Anderson

(57) ABSTRACT

Provided is an infinitely variable cone pulley transmission for which the contact pressure between the cone pulley pairs and the traction is generated hydraulically on one transmission side and mechanical, with the aid of a spring, on the other transmission side. The second transmission side is provided with an axially fixed and an axially movable cone pulley with extended hub. The contact pressure mechanism includes a cam sleeve that is fixed relative to the shaft, a cam sleeve formed by the free end of the hub and roll bodies for the force transmittal, which are inserted between opposite arranged cam curves and rotate around axes extending radial to the transmission shaft. The roll bodies are guided by rings and are held at a mutual distance to each other and with spring force in the axial center region between the cam sleeves, wherein the spring is arranged coaxial on the extended hub.

12 Claims, 11 Drawing Sheets

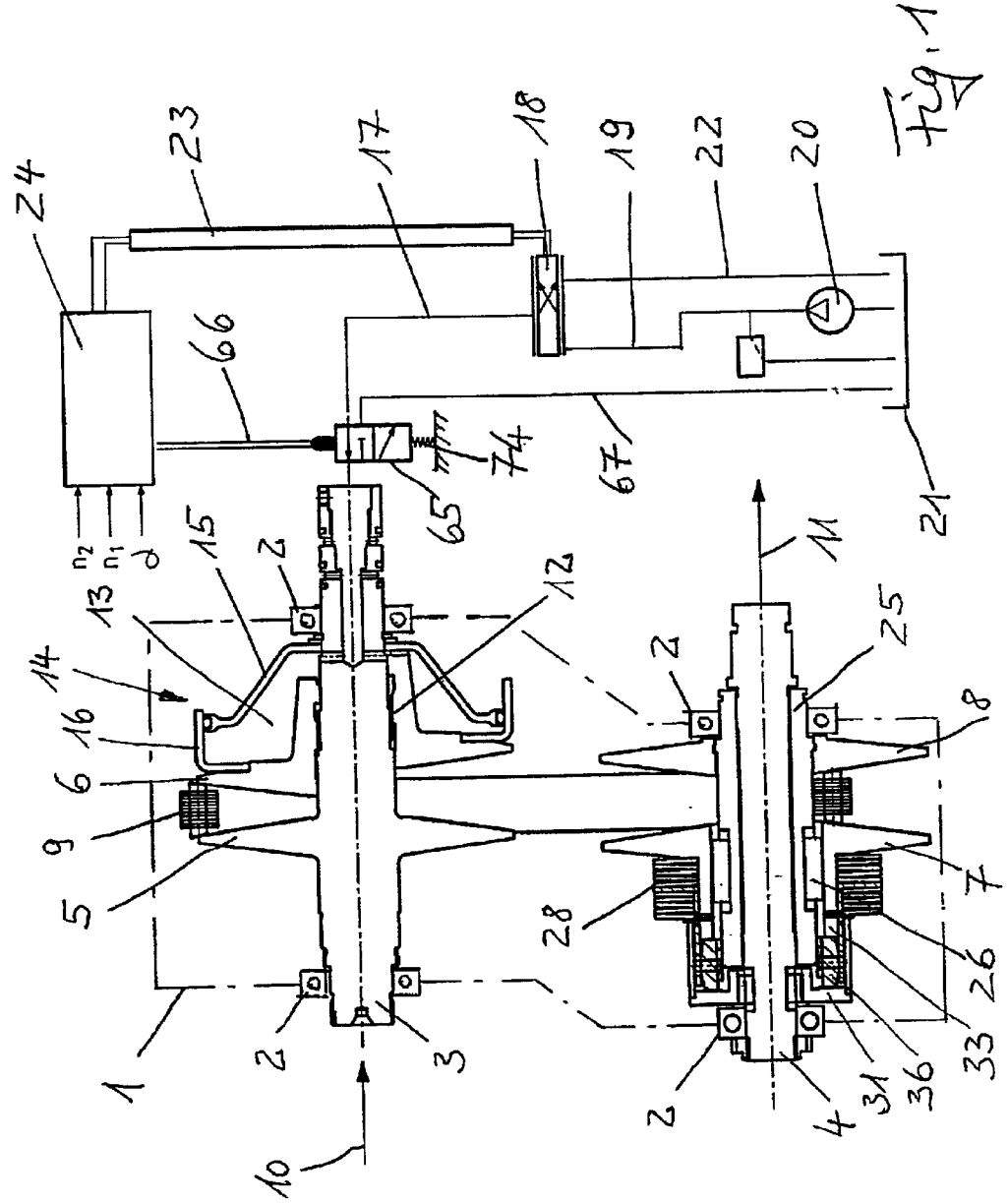

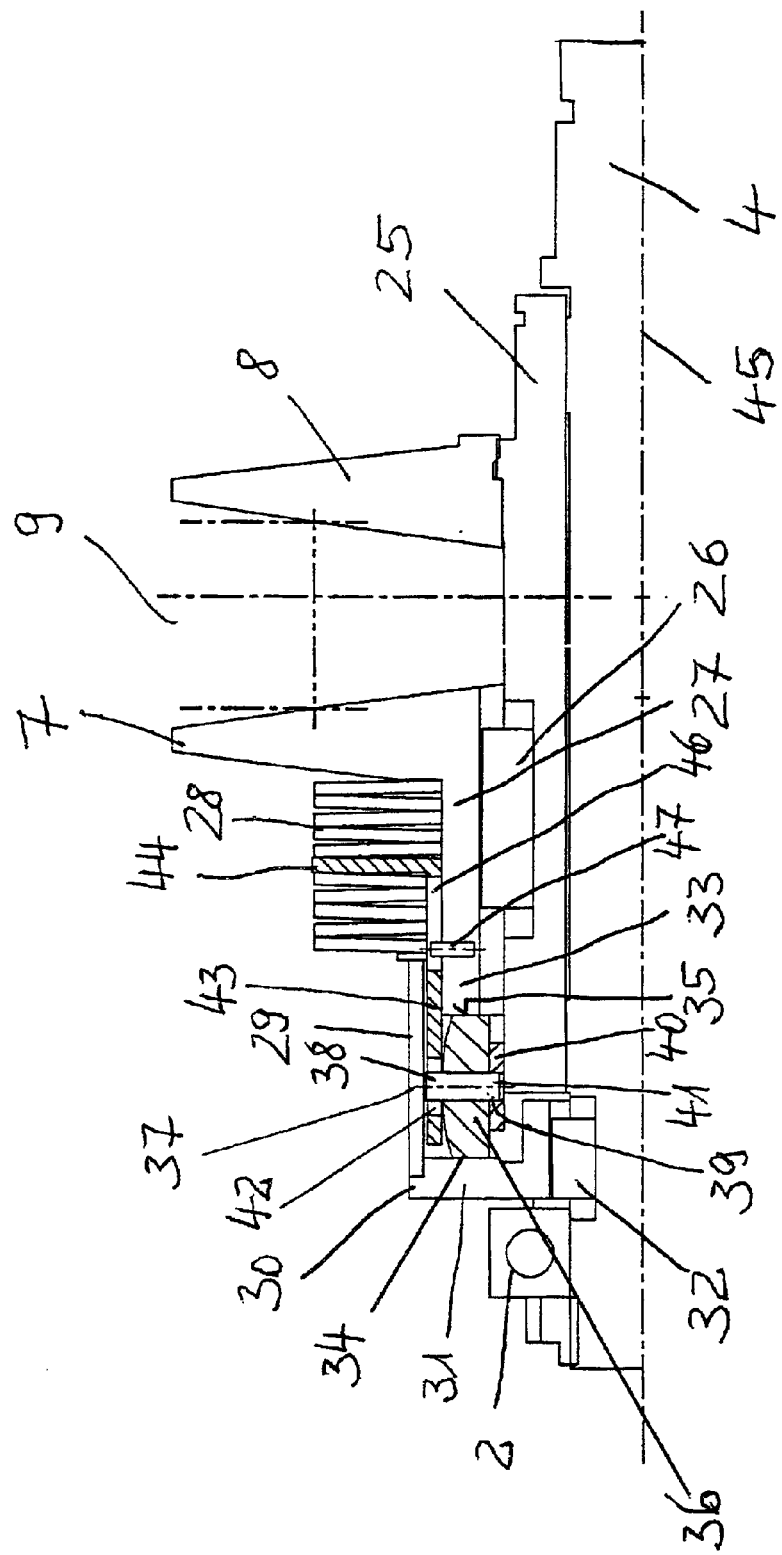

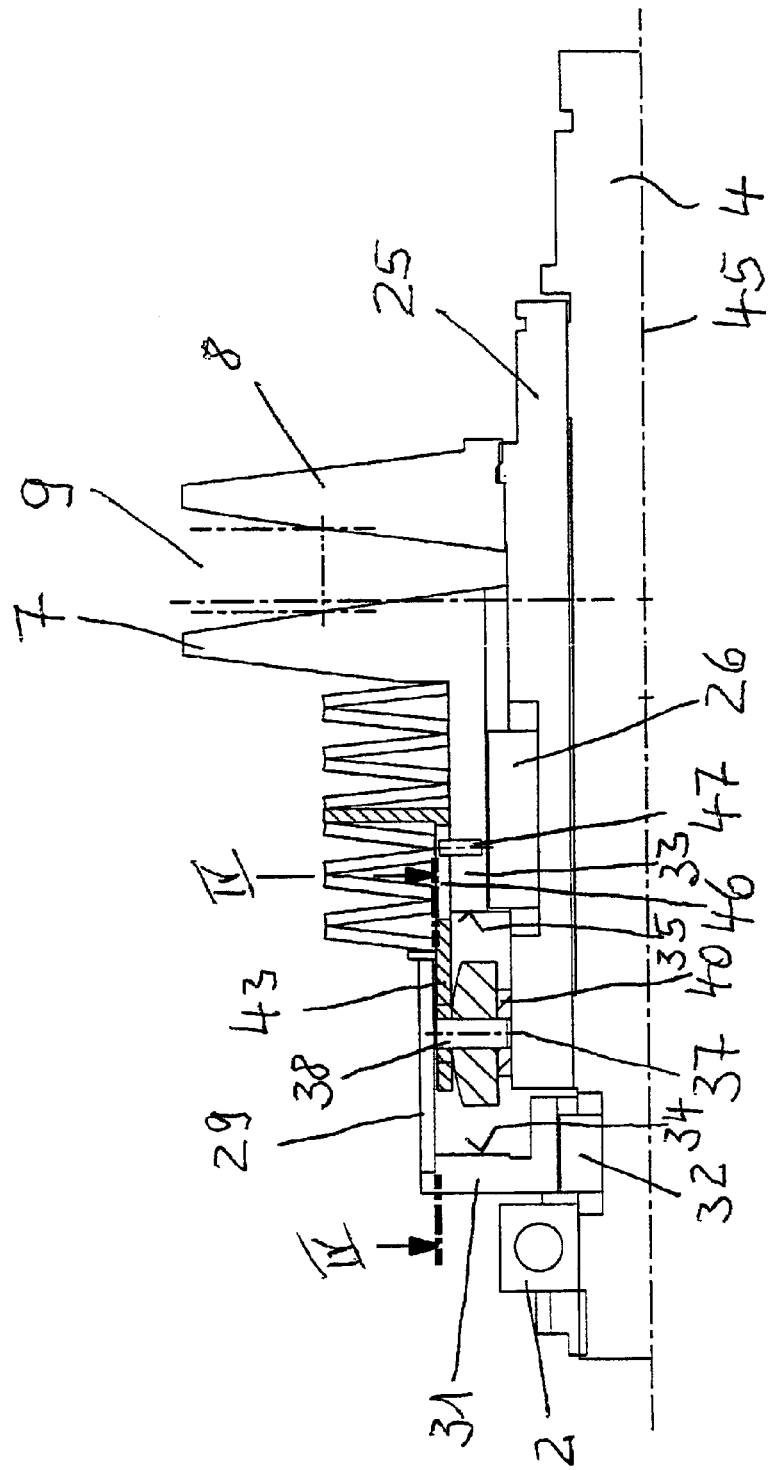

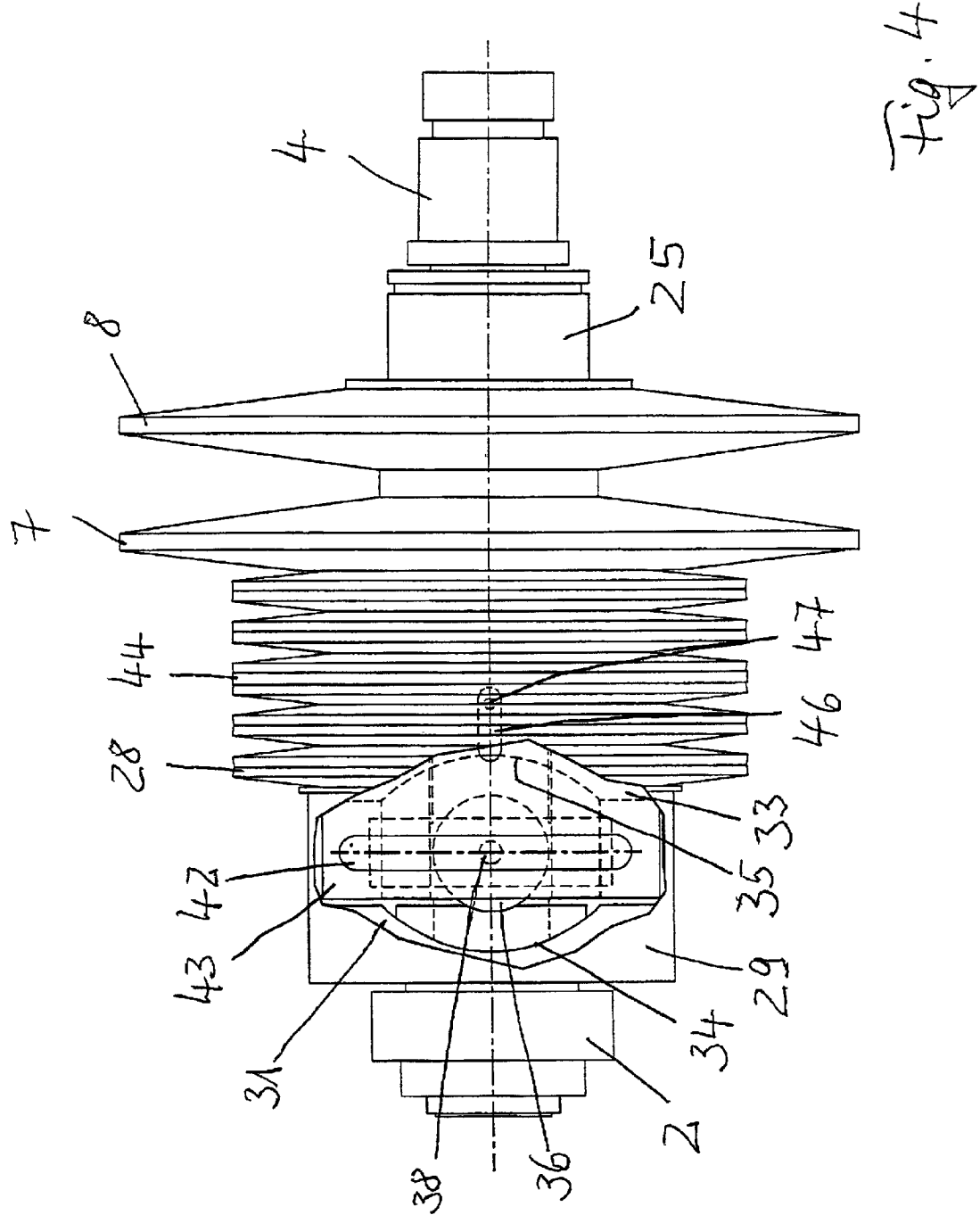

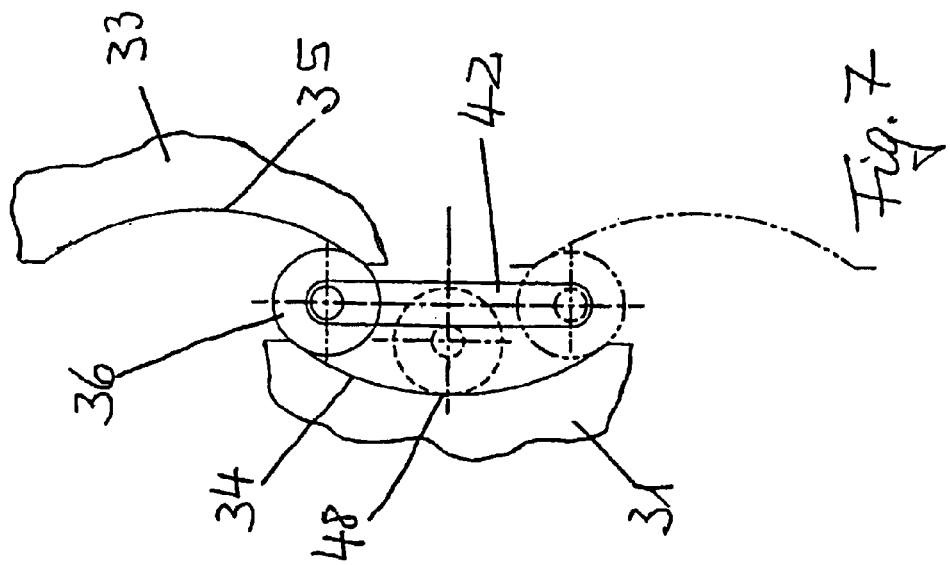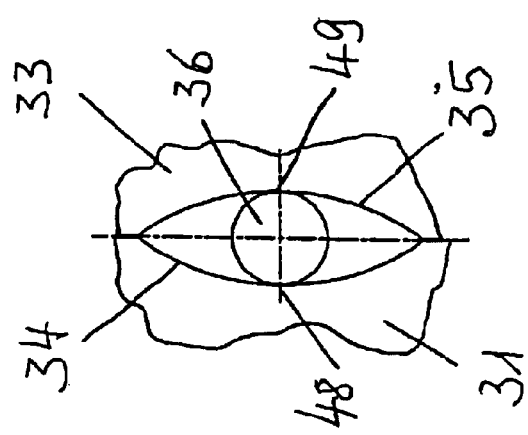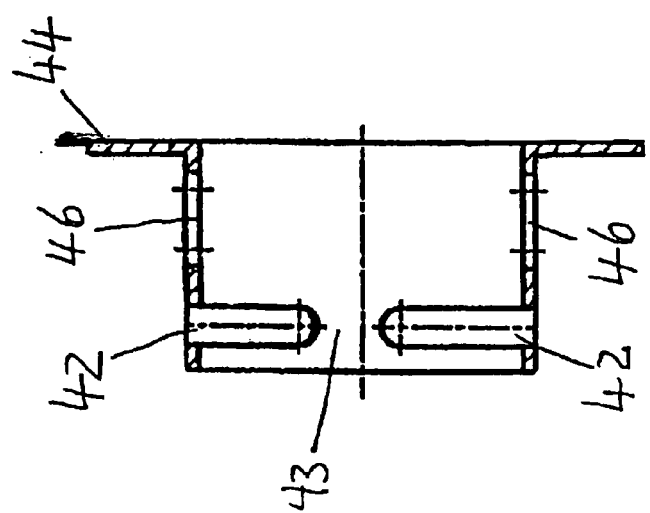

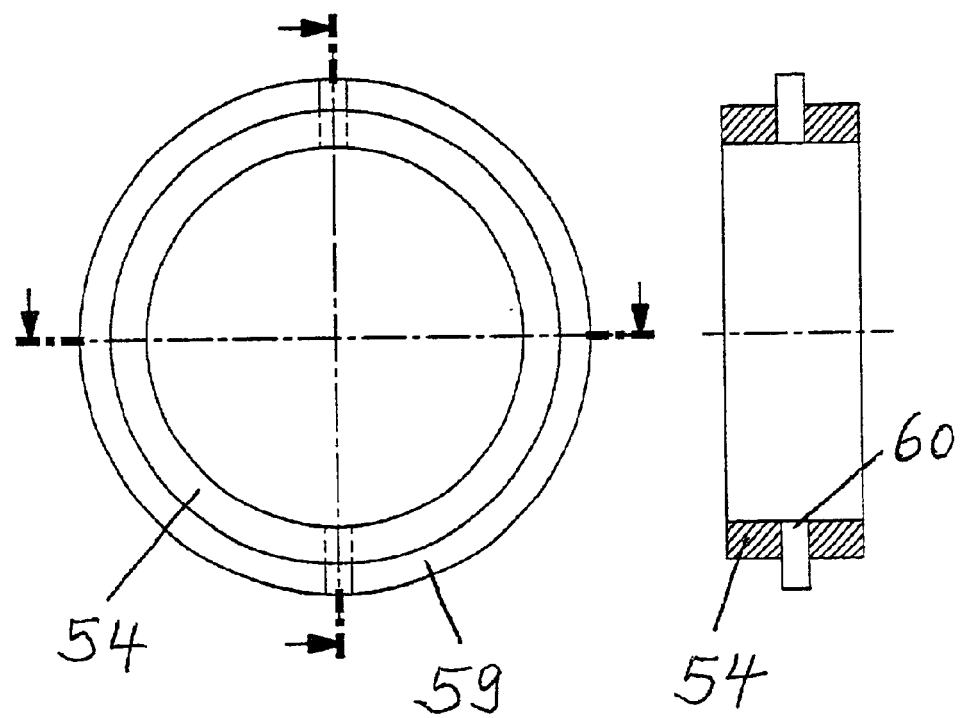
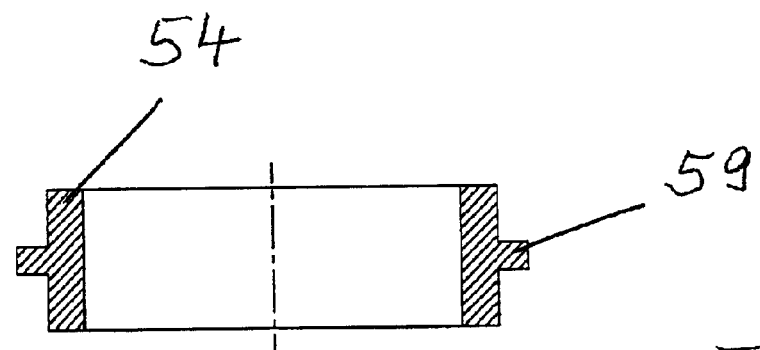
Fig. 11

BEVEL GEAR UNIT

CROSS-REFERENCE TO RELATED APPLICATION

This application claims the priority of German Patent Application Serial No. 100 58 475.6 filed on Nov. 24, 2000, the subject matter of which is incorporated herein by reference.

BACKGROUND OF THE INVENTION

The present invention relates an infinitely variable cone pulley transmission and generating of axial contact pressures exerted by the cone pulleys onto a traction means, rotating between these cone pulleys, via tensioning means arranged on the transmission shafts, which act in axial direction onto respectively one cone pulley that can be axially displaced along the respective transmission shaft. For this, hydraulic means are provided on a first transmission side for adjusting and maintaining the transmission ratio and a spring that is braced against a support, fixed relative to the shaft, is provided on the second transmission side.

A cone pulley transmission of this type is known, among other things, from German reference DE 43 00 879 and is used whenever a cost-effective transmission is desired for small vehicles and simple industrial applications. The disadvantage of the known transmission, however, is its inability to generate load-dependent contact pressure forces between cone pulleys and traction means. Rather, the spring that generates the contact pressure force on one of the transmission sides determines the output limit for the transmission. In other words, it means that the spring must be designed for a certain maximum output that can be transmitted by the transmission. With a low power transmission, the transmission therefore operates with an excess contact pressure between cone pulleys and traction means and thus with a more or less high loss.

In order to generate the above-mentioned contact pressure forces load-dependent and with the lowest possible losses, it is known that these contact pressure forces can be generated with corresponding control and exclusively with hydraulic means on both transmission sides. Another option is to generate the contact pressure forces purely mechanical, with the aid of so-called contact pressure mechanisms.

A third option consists in the combination of these two systems, for example as disclosed by the subject matter of German references 2 016 181 and 2 058 399. According to the aforementioned reference, the contact pressure forces on both transmission sides are generated load-dependent with contact pressure mechanisms of the aforementioned type. These mechanisms are parallel connected to a device for generating hydraulic contact pressure forces for adjusting and maintaining the transmission gearing. With respect to the design, it means that the respective axially displaceable cam sleeve of the contact pressure mechanism is also positioned axially displaceable on a neck-type extension of the cone pulley, which can be displaced in axial direction to vary the transmission ratio, and is stressed in the direction toward the contact pressure mechanism cam sleeve that is fixed relative to the shaft by a compression spring, arranged between displaceable cam sleeve and adjacent cone pulley. This type of design is extremely space consuming, especially in radial direction, and is thus too costly for simple cone pulley transmissions, especially when considering the scope of the hydraulic control required to adjust and maintain the transmission ratio.

It is the object of the invention to develop a more effective cone pulley transmission of the aforementioned type, which has a mechanical device for the load-dependent generating of contact pressure forces, but does not require additional space on the transmission side in question, particularly in radial direction.

SUMMARY OF THE INVENTION

This object is solved according to the invention by arranging on the second transmission side one axially fixed cone pulley and one axially movable cone pulley that is provided with an extended hub. The object is further solved by connecting the cone pulleys so as to rotate together and such that they rotate jointly on their transmission shaft and are coupled to this shaft via a contact pressure mechanism depending on the rotational moment or a rotational moment and the transmission ratio. The object is furthermore solved in that the contact pressure mechanism consists of a cam sleeve, fixed relative to the shaft, a cam sleeve formed by the free end of the extended hub, as well as roll bodies, which are inserted between the opposite-arranged cam tracks and rotate around axes that are positioned radial relative to the transmission shaft, so as to transmit the forces. The roll bodies are guided by rings, are held at a mutual distance to each other and arc adjusted in axial direction with spring force to remain in the region of the axial center between the cam sleeves by a spring that is arranged coaxial on the extended hub.

These measures according to the invention make it possible for the transmission side with mechanical generating of the contact pressure forces to generate these contact pressure forces load-dependent and thus only within the scope required for the momentary output transmitted by the transmission. The purpose of the spring that is now connected parallel to the contact pressure mechanism is reduced to providing a basic contact pressure in case the transmission is idling and no contact pressure force is generated by the contact pressure mechanism. The transmission thus can operate without specific losses.

Since the axially displaceable cam sleeve for the contact pressure mechanism is now integrated into the free end of the extended hub of the associated cone pulley, a design results that requires comparatively no additional space in radial direction. In particular, it is not necessary to arrange the axially displaceable cam sleeve of the contact pressure mechanism as additional component radially outside of the extended hub of the axially displaceable cone pulley, as is necessary for the above-described case.

Since the axially displaceable cam sleeve of the contact pressure mechanism is now an integral component of the axially displaceable cone pulley, as mentioned before, it means that this cam sleeve always assumes only an axial position that corresponds to the transmission-ratio dependent axial position of the displaceable cone pulley. In the event that no load is applied to the transmission, it would then be possible for the roll bodies to assume a position at the bottom of the cam curves formed by the cam sleeves. If a load is applied once more, a spinning of the cam sleeves could result, at least in those gearing positions of the transmission where the cone pulleys of the second transmission side are positioned close together. To keep this from happening, the additional feature of the invention ensures that the roll bodies are always kept in the region of the axial center between the cam sleeves, even in the case of a non-loaded transmission, meaning an idling transmission.

In a manner known per se, it has proven advantageous that the of the second transmission side are arranged on a hollow shaft, which is positioned so as to rotate on the transmission shaft but cannot be displaced in axial direction. It is furthermore advantageous that the axially fixed cone pulley is rigidly connected to the hollow shaft, the axially displaceable coney pulley is connected rotatingly to the hollow shaft and the cam sleeve that is fixed relative to the shaft is arranged next to the hollow shaft on the transmission shaft, such that it rotates along and cannot be moved axially, at least not in the direction away from the opposite arranged cam sleeve. The axially fixed cone pulley in this case can form one piece with the hollow shaft.

One embodiment of the invention advantageously provides that the roll bodies, having pinions that project radially from the roll bodies toward the transmission shaft and are coaxial to their rotational axes, engage in corresponding recesses in the rings. For this, a holding ring that is coaxial to the shaft can be arranged radial to the transmission shaft inside or outside of the roll bodies, wherein the pinions of the roll bodies are positioned so as to rotate inside holding ring bores that are positioned radial to the transmission shaft.

According to one design, a guide ring in the form of a hollow-cylindrical sleeve can be arranged radial to the transmission shaft, outside of the roll bodies, which encloses the roll bodies as well as the extended hub. The guide ring can be arranged so as to be displaceable, but non-rotating relative to the hub, in axial direction along the extended hub while outward projecting pinions on the roll bodies are positioned so as to rotate inside circumferential slots that extend along a radial plane of the transmission shaft. The axial width of these slots corresponds to the diameter of the pinions and the pinions are furthermore held in the axial center region between the cam sleeves. The length of the circumferential slots in circumferential direction corresponds at least to half the maximum mutual circumferential path covered by the cam sleeves for the contact pressure mechanism. Furthermore, the guide ring end facing the axially movable cone pulley is connected to the spring in such a way that moving in the same direction, it also traverses essentially half the axial path of the movable cone pulley each time.

For this, the spring can be braced against the axially displaceable cone pulley as well as against the cam sleeve that is fixed relative to the shaft. In further detail, the arrangement can actually be a disk spring assembly, one half of which is essentially arranged on the hub and the other half on the guide ring. The spring can be braced against the cam sleeve via a hollow-cylindrical intermediate segment that encloses the guide ring, wherein the guide ring is caught between the two halves of the disk spring assembly with a radially outward pointing collar at the end.

To ensure that the guide ring and thus also the circumferential slots remain in the position assigned to the cam curves for the cam sleeve, the guide ring section located on the hub is advantageously provided with at least one groove extending parallel to the transmission shaft. A pin supported by the hub engages in this groove to prevent rotation.

The above-described first design also ensures that the roll bodies are always held with spring action in the axial center between the two cam sleeves of the contact pressure mechanism, even if no load is applied to the transmission. On the other hand, they can also move unhindered to the degree necessary in circumferential direction along with the cam curves of the contact pressure mechanism because of the guide ring. This ensures that the roll bodies always engage in the cam curves, even if the transmission is switched from the idle state back to a load condition.

The same result is achieved with a second embodiment of the invention. With this embodiment, a guide ring is arranged radial to the transmission shaft outside of the roll bodies, which takes the form of at least one assembly of axially side-by-side arranged, ring-shaped corrugated springs with reciprocating undulations in axial direction along the circumference. The guide ring furthermore is captured in axial direction between a collar supported by the hub and a rotating collar supported by the cam sleeve, fixed relative to the shaft, and is held in the axial center position relative to the contact pressure mechanism. Radially outward projecting pinions on the roll bodies furthermore are positioned so as to rotate in the axial center region of this guide ring., Thus, a design has been developed, which ensures the axial center positioning of the roll bodies between the cam sleeves of the contact pressure mechanism, independent of the spring that guarantees the basic contact pressure of the axially displaceable cone pulley.

As modification of this solution, the guide ring can be provided, which is composed of two identical, axially side-by-side arranged corrugated spring assemblies, wherein the corrugated springs of each assembly are braced against each other and are fixedly connected to each other via undulation crest that face each other. The pinions on the roll bodies are positioned so as to rotate between the corrugated disk spring assemblies. To achieve the latter, the holding ring is advantageously arranged outside of the roll bodies, between these and the guide ring composed of corrugated springs, and is provided with a rotating collar that projects radially outward from its axial center and extends between the corrugated spring assemblies. For this, the bores in the holding ring for the roll body pinions can also extend through the collar. If, according to another feature of the invention, the axial width of the collar corresponds to the thickness of the roll body pinions, only circumferential sections of the collar remain between the pinions of neighboring roll bodies, as seen in circumferential direction. This represents a particularly space-saving and weight-saving design.

The spring that ensures the basic contact force of the axially displaceable cone pulley for this design can be arranged on the hub and can be braced against the axially movable cone pulley as well as against the cam sleeve that is fixed relative to the shaft via an essentially hollow-cylindrical intermediate segment that extends past the guide ring. Furthermore, the guide ring collar supported by the cam sleeve, which is fixed relative to the shaft, and the intermediate segment can be combined to form one component.

A cone pulley transmission of the type discussed herein requires that for a change in the transmission ratio, which requires emptying the pressure cylinder arranged on the first transmission side, the necessary axial force is derived via the traction means from the contact pressure force exerted upon the traction means on the second transmission side. This force is also sufficient for a rapid adjustment of the transmission ratio if the transmission operates under normal load conditions. However, if the transmission is in the idle state or at a standstill, only the spring ensuring the basic contact pressure is active on the second transmission side. However, the force exerted by this spring, which is further reduced during the movement to the first transmission side as a result of frictional forces, is only sufficient for a relatively slow adjustment of the transmission ratio in the above-mentioned cases. Added to this is the fact that the pressure medium that must be pushed out of the pressure cylinder must also pass by the correspondingly adjusted control valve while overcoming corresponding resistances.

According to a modified version of the invention, a reversing valve is installed in the intake line for the pressure medium to counteract this effect, which reversing valve can connect the pressure chamber to the pressure medium supply or the suction-in side of a pressure medium pump. As a result of this measure, the pressure medium at least can flow unhindered from the pressure cylinder. The cross section for a discharge of this type without problems is dimensioned accordingly large. It is also possible to suction the pressure medium from the pressure cylinder, meaning the adjustment of the transmission ratio is actively encouraged.

It is understood that the activation of the reversing valve occurs based on the remaining marginal conditions of the transmission, at least for the aforementioned critical cases. For this, the control device for the control valve can be used to activate the reversing valve, wherein the determinants for the transmission operation are supplied to this control. However, this also requires a special activation member that is triggered by the control. Another option therefore may be to activate the reversing valve with the aid of the pressure existing in the pressure medium intake line. Since this pressure exerted by the pressure medium is derived from the valve position specified by the control, a corresponding determinant is automatically provided for adjusting the reversing valve. However, the determinant for this design option is also obtained automatically if, during a pause in the transmission operation, the transmission ratio is to be changed, so as to require the emptying of the pressure cylinder. However, this can only be helpful for a rapid change in the transmission ratio.

BRIEF DESCRIPTION OF THE DRAWINGS

These and other features and advantages of the invention will be further understood from the following detailed description of the preferred embodiments with reference to the accompanying drawings in which:

FIG. 1 Shows a simplified view of an infinitely variable cone pulley transmission.

FIG. 2 Shows the enlarged sectional representation of the second transmission side shown in FIG. 1, with mechanical generating of the contact pressure forces in a first operating position.

FIG. 3 Shows the subject matter according to FIG. 2, in a different operating position.

FIG. 4 Shows a view from above of the subject matter according to FIG. 3, shown as a partial sectional view along the sectional line IV—IV in FIG. 3.

FIG. 5 Shows a detail of the subject matter according to FIG. 4, in a sectional view.

FIG. 6 Shows the progression of the cam position of the contact pressure mechanism for FIG. 2.

FIG. 7 Shows the progression of the cam position of the contact pressure mechanism for a different gearing position.

FIG. 11 Shows a detail from FIG. 8, in an axial view, as well as two sectional views that are offset relative to each other by 90°.

DETAILED DESCRIPTION OF THE PREFERRED EMBODIMENTS

Figure 8:
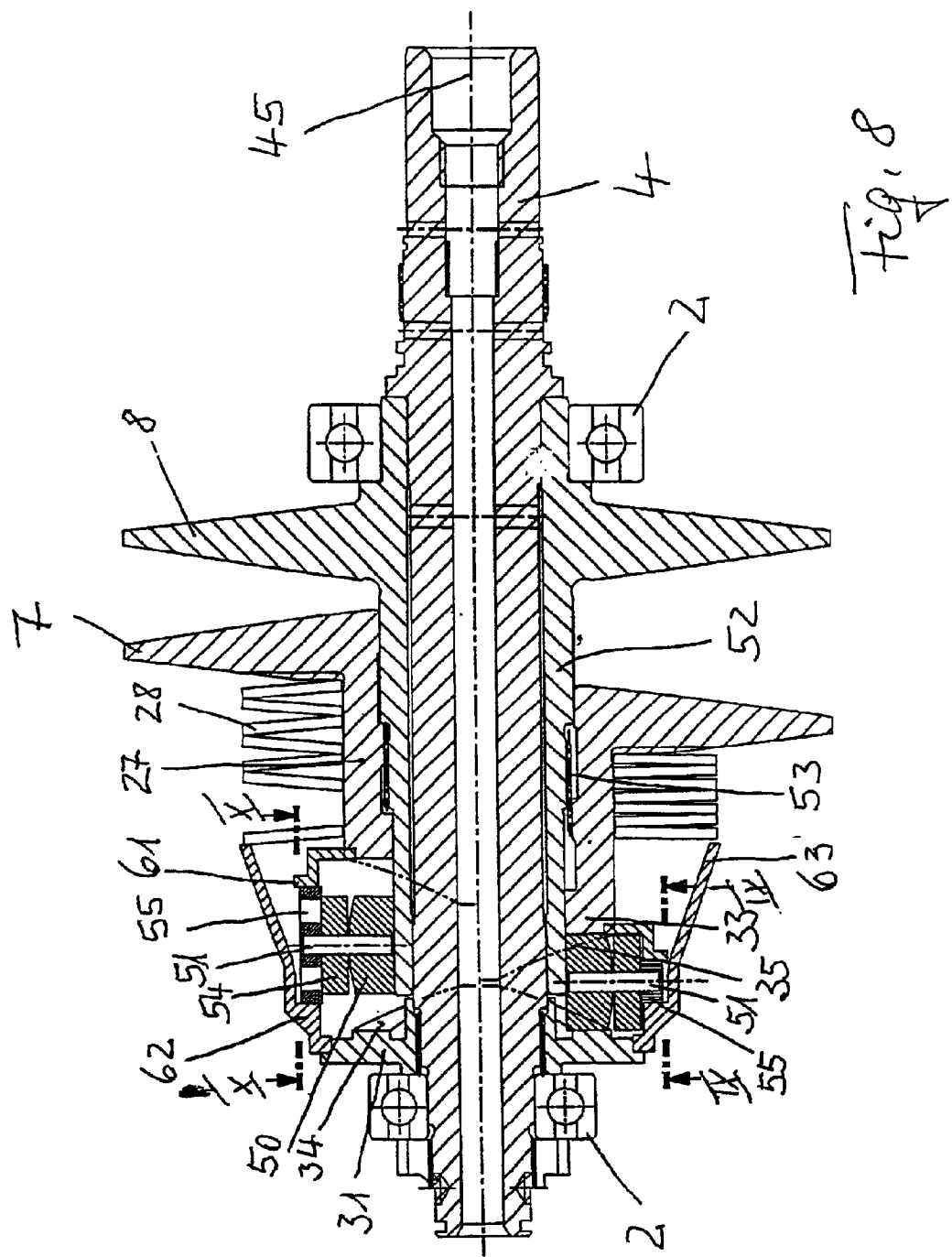
FIG. 8 Shows a different structural design of the transmission side with mechanical generating of the contact pressure forces.

The continuously adjustable bevel transmission shown in FIG. 1 is contained inside a schematically indicated housing 1 and essentially comprises shafts 3 and 4 that rotate inside the housing 1, via the bearings 2. Arranged on these shafts are cone pulleys 5 to 8, between which a traction means 9 circulates. Arrows 10, 11 illustrate that the shaft 3 is the drive shaft for the transmission shown herein, meaning the unit connected to shaft 3 represents the first transmission side. The shaft 4, on the other hand, is the output shaft of the transmission and the unit connected thereto represents the second transmission side.

The bevel gear 5 is arranged on the shaft 3, such that it rotates along and cannot be displaced axially and, for the present case, forms one piece together with the shaft 3. On the other hand, the bevel gear 6 can be displaced axially along the shaft 3, but is connected to this shaft so as to rotate along via a serration 12. The axial adjustment of bevel gear 6 occurs with a pressure cylinder 14 that forms a pressure chamber 13 and comprises a piston 15, fixed relative to the shaft, a cylinder jacket 16 supported by the bevel gear 6 and a cylinder bottom formed by the bevel gear 6 itself The pressure cylinder 14 is connected via a pressure line 17 to a control valve 18, which is connected via a line 19 to the pressure side of a pump 20 that can suction in pressure medium from a supply container 21. On the other side, the control valve 18 is connected via a return-flow line 22 directly to the supply container 21.

The cone pulley 5 is arranged on the shaft 3, such that it rotates along and cannot be displaced axially and, for the present case, forms one piece together with the shaft 3. On the other hand, the cone pulley 6 can be displaced axially along the shaft 3, but is connected to this shaft so as to rotate along via a serration 12. The axial adjustment of cone pulley 6 occurs with a pressure cylinder 14 that forms a pressure chamber 13 and comprises a piston 15, fixed relative to the shaft, a cylinder jacket 16 supported by the cone pulley 6 and a cylinder bottom formed by the cone pulley 6 itself The control valve 18 thus functions to adjust and maintain the transmission ratio. For this, the control valve 18 is activated via a line 23 by a control unit 24, to which the necessary operating variables are supplied. The following are entered as operating variables for the present case of a motor vehicle: a speed $n_1$, for example the engine speed, a speed $n_2$, for example the driving speed, as well as the engine throttle valve position $\alpha$.

On shaft 4 of the second transmission side, the cone pulleys 7 and 8 are arranged on a hollow shaft 25, which can rotate, but cannot be displaced in axial direction on this shaft 4. The cone pulley 8 is fixedly connected to the hollow shaft 25 while the cone pulley 7 can be displaced in axial direction along the hollow shaft 25 but is connected to it non-rotating via an adjusting spring 26.

Mechanical means for generating the necessary contact-pressure force, relative to the traction means 9, act upon the cone pulley 7. These means are explained with the aid of FIG. 2, which shows the second transmission side from one half of FIG. 1.

FIG. 2 shows that the cone pulley 7 has an extended hub 27, on which a disk spring assembly 28 is positioned concentrically, which is braced against the radially outward projecting collar 30 of a cam sleeve 31 via a hollow-cylindrical intermediate section 29. The cam sleeve is supported at least in axial direction on the shaft 4, starting with the cone pulley 7 and is otherwise rotatingly connected to the shaft 4 via an adjusting spring 32. The disk spring assembly 28 exerts an axial force onto the cone pulley 7, which depends somewhat on the axial position of the cone pulley 7 but remains essentially the same. Thus, the force exerted onto the traction mechanism 9, which is only indicated herein, is always present as basic contact pressure and prevents the traction means 9 from slipping through, relative to the cone pulleys.

On the side facing the cam sleeve 31, the extended hub of cone pulley 7 also forms a cam sleeve 33. Roll bodies 36 are inserted between the opposite-arranged cam curves 34 or 35 of cam sleeves 31 or 33, which roll bodies can rotate around the axes 37 that are positioned radial to the shaft 4. For the positioning of these roll bodies 36, they are provided with outward projecting pinions 38 and inward projecting pinions 39. Inside the roll bodies 36, a rotating holding ring 40 is arranged on the hollow shaft 25 and accommodates the pinions 39 in matching bores 41. Outside of the roll bodies 36, the projecting pinions 38 engage in the circumferential slots 42 of a guide ring 43. The guide ring end facing the axially displaceable cone pulley 7 is clamped in with a radially outward projecting collar 44 at the longitudinal center of the spring assembly 28. The guide ring is rotationally connected to the hub 27 via at least one groove 46 that extends parallel to the axis 45 of shaft 4 and a radial pin 47 of hub 27 that engages in this groove.

The appearance of this guide ring 43 is illustrated once more with further detail in FIG. 5, which shows this guide ring as a radial section. In addition, FIG. 5 shows opposite arranged circumferential slots 42, which correspond to two opposite-arranged roll bodies 36. These slots extend across an arc that is smaller than 180° but is large enough so that the roll bodies 36 can perform the operationally required movements along the cam curves 34, 35 of the contact pressure mechanism formed by the roll bodies and the cam sleeves 31, 33.

The circumferential positions of cam curves 34, 35 are shown in FIG. 6 and correspond to FIG. 2. It must be stated here that the cone pulleys 7, 8 in the representation according to FIG. 2 are at their greatest distance from each other, which corresponds to the maximum adjustment of the transmission at output speeds that are too slow. Correspondingly, the cam curves 34, 35 that extend along the circumference are also adjusted to the smallest possible distance relative to each other, so that the roll bodies 36 make contact with the cam curves in the region of their respective cam bottom 48 or 49. If, subsequently, a rotational moment occurs between the cam sleeves 31 and 33, the roll bodies 36 want to run up along the cam curves 34 or 35. As a result, the force seeks to move apart the cam sleeves 31, 33 in axial direction. Since the cam sleeve 31 is rigidly supported in axial direction on the shaft 4, this expanding force if transmitted via the cam sleeve 33 and the hub 27 directly to the cone pulley 7, where it becomes a contact pressure force exerted onto the traction means 9. This force corresponds to the magnitude of the rotational moment that occurs and must be transmitted and, corresponding to the inclination of cam curves 34, 35, also corresponds to the variable for the transmission ratio position of the transmission.

FIGS. 3 and 4 show the subject matter according to FIG. 2 in the transmission ratio position, for which the cone pulleys 7, 8 are at the shortest possible distance to each other in axial direction. This position corresponds to the transmission ratio position where the transmission is adjusted toward the fastest possible output speeds and involves the cam curves 34, 35 being at a correspondingly grater mutual distance in axial direction, as can be seen in FIG. 7. The roll bodies 36 in this case fit flush against the cam curves in the end regions of cam curves 34, 35 when a rotational moment is transmitted.

If, for example, the transmission enters a no-load or idle condition during this position, no transmittal of the rotational moment occurs between the cam sleeves 31, 33, which keeps the roll bodies 36 in the center region between the cam curves 34, 35. Rather, the angle position of the cam sleeves 31, 33 is undetermined, relative to each other. In that case, the roll bodies could also assume the position shown with dashed line in FIG. 7, for example on the cam bottom 48 of cam curve 34. If a rotational moment then occurs again between the cam sleeves 31, 33, the cam curve 35 could move past the roll bodies 36 in circumferential direction, without coming in contact with these. It means that the cam sleeve would spin without the possibility of transmitting the rotational moment.

The same situation could occur with respect to FIG. 7 if the transmission were subjected to a reversal in the rotational direction, meaning the cam sleeve 33 would jump from the position shown on the top of FIG. 7 to the position shown on the bottom of FIG. 7.

The previously described guide ring 43 is designed to counteract this. Since this guide ring with its collar 44 is attached to the disk spring assembly 28, approximately at the longitudinal center in lengthwise direction, it partially also experiences the longitudinal change of the disk spring assembly 28, caused by the axial movement of the cone pulley 7. As a result and through the engagement in the circumferential slots 42, the roll bodies 36 are always held in the region of the axial center between the cam curves 34, 35.

The progression in FIG. 7 again shows the length of the circumferential slots 42, which must be sufficient for the roll bodies 36 to traverse the maximum path in circumferential direction, visible in FIG. 7, to match both rotational directions of the transmission.

Finally, with respect to FIGS. 3 and 4, it must be pointed out that differing from FIG. 7, the cam sleeves 31, 33 are shown in the circumferential position relative to each other, for which the complete circumference of both opposite-arranged cam curves 34, 35 is shown. Such a position is also conceivable for the no-load operation of the transmission. It shows particularly clearly which degree of freedom of movement the roll bodies 36 would have in axial direction of the shaft 4 if they were not held by the guide ring 43 and its circumferential slots 42 in the center between the two cam curves 34 and 35.

FIGS. 8 to 11 show a modified version of the design for the second transmission side, illustrated in FIGS. 1 to 7, wherein the same objects are given the previously introduced reference numbers. It must be pointed out in this connection that FIG. 8 in the lower half of the representation shows the distance between the cone pulleys 7, 8 according to FIG. 2 and in the upper half of the representation shows the distance between these cone pulleys according to FIG. 3.

Figure 10:
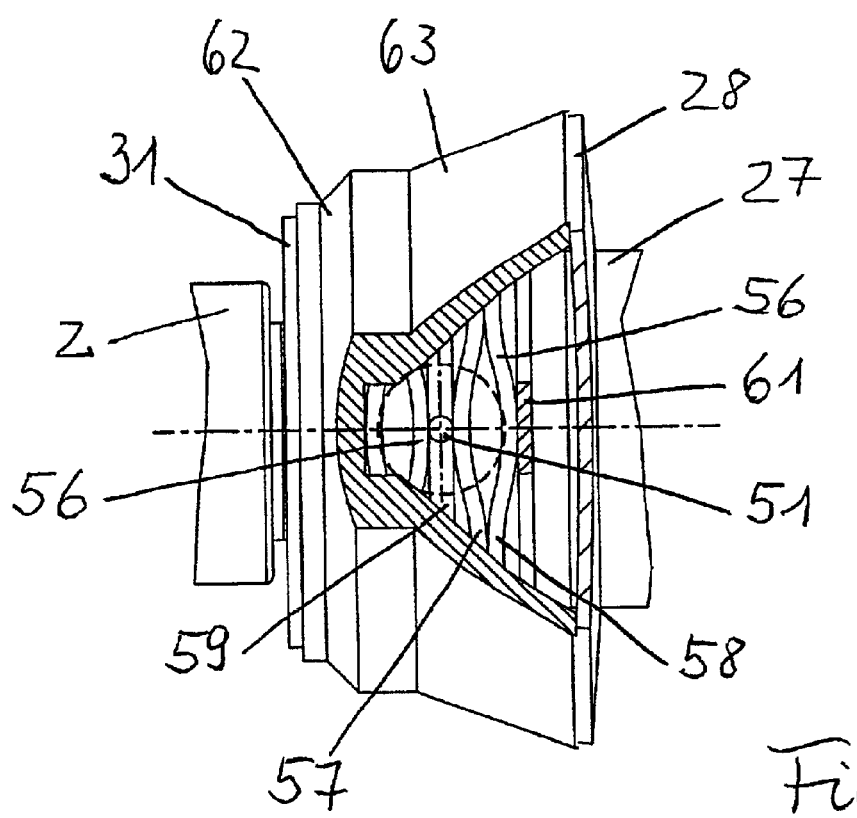
FIG. 10 Shows the sectional view X—X from FIG. 8.

FIGS. 8 and 10 show the roll bodies 50 provided with only one radially outward projecting rotating pinion 51, whereas in radial inward direction, the roll bodies are supported directly on the hollow shaft 52, which in this case forms one piece with the cone pulley 8. The cone pulley 7 in turn is secured by means of a serration 53 on this hollow shaft, such that it can be moved in axial direction but is prevented from turning.

The pinions 51 extend through matching bores in a holding ring 54, arranged radially outside of the roll bodies 50, and furthermore project into a guide ring 55 that is arranged outside of the holding ring 54 and consists of two corrugated spring assemblies 56, arranged side-by-side in axial direction, as can be seen best in FIG. 10. These corrugated springs 56, which extend circular around the circumference, are arranged relative to each other so as to fit against each other with facing undulation crests 57, 58, which are connected non-detachable, for example by welding them together.

The pinions 51 of roll bodies 50 project between the corrugated spring assemblies. The holding ring 54 is provided with a radially outward projecting collar 59 that engages between the corrugated spring assemblies to keep the pinions together with the holding ring 54 positioned in the center between the corrugated spring assemblies, as can be seen in FIG. 11. The axial thickness of collar 59 corresponds in this case to the diameter for pinion 51, so that the radially outward continued bores 60 of holding ring 54 divide the collar 59 for the pinions 51.

The corrugated spring assemblies 55 are braced on the outside in axial direction on one side against a collar 61, which is supported by the free end of hub 27 or the cam sleeve 33 formed thereon. On the other side, the corrugated spring assemblies are braced axially against a collar 62, attached in radial direction to the outside of cam sleeve 31.

An essentially hollow-cylindrical intermediate segment 63, which axially encircles the guide ring 55, is provided so that the axial counter support for the disk spring assembly 28 also occurs via the cam sleeve 31 that is fixed relative to the shaft, as previously described for the design shown in FIGS. 1 to 7. For reasons of simplicity, this intermediate segment forms one unit with the collar 62 for the present embodiment.

Figure 9:
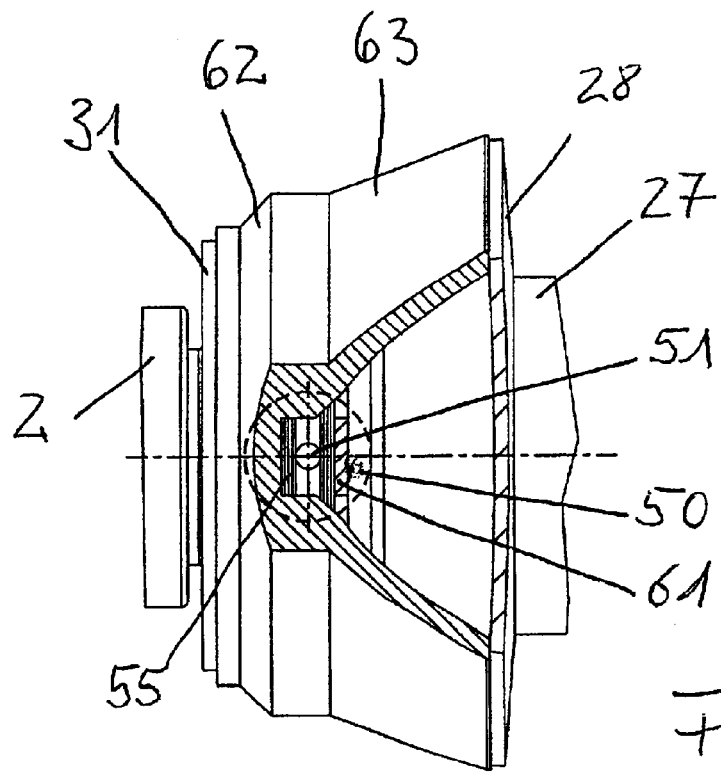
FIG. 9 Shows the sectional view IX—IX from FIG. 8.

Corresponding to the two axial distances between the bevel gears 7 and 8, shown in FIG. 8, the guide ring 55 of corrugated springs 56 is axially compressed to form a block in the lower half of FIG. 8, which also includes the view according in FIG. 9. In contrast, the guide ring shown in the upper view of FIG. 8, which also includes FIG. 10, is expanded to the maximum axial extent. As can be seen, it is always ensured that the roll bodies 50 are held in the axial center between the cam sleeves 31, 33, so that a spinning of the contact pressure mechanism that comprises the cam sleeves cannot occur in the manner described with FIG. 7.

With the design for the second transmission side, described in detail in the above with the aid of FIGS. 2 to 11, a variable that depends on the rotational moment and the gearing can be generated for the contact pressure forces exerted onto the traction means 9. To return to the view according to FIG. 1, this results in a corresponding expansion force for the first transmission side, with which the traction means 9 attempts to push apart cone pulleys 5 and 6 in axial direction. To counter this force and maintain and adjust the transmission ratios a corresponding pressure is generated inside the pressure chamber 13 of pressure cylinder 14 by supplying a pressure medium via the control valve 18.

If, in particular during the standstill or idling of the transmission, a change must be made in the transmission ratio and it becomes necessary to empty the pressure chamber 13, only the force of spring 28 is available for pushing the pressure medium from the pressure chamber 13. This spring force acts upon the axially displaceable cone pulley 7 on the second transmission side and attempts to displace the cone pulley 7 in axial direction toward the cone pulley 8 via the traction means 9. As a result, the cone pulley 6 is moved in axial direction away from the cone pulley 5. However, since only one basic variable exists for the spring 28 force to ensure that the traction means does not hang down loosely between the respective cone pulley pairs, it would take a correspondingly long time to empty the pressure chamber 13 via the control valve 18; and the return flow line 22, which frequently is not available or is undesirable.

To counteract this effect, a reversing valve 65 is arranged inside the pressure medium line 17, wherein the reversing valve can be actuated by the control unit 24 via the line connection 66.

In the position shown in FIG. 1, the reversing valve 65 allows the hydraulic pressure, exerted by the control valve 18 onto the pressure line 17, to enter the pressure chamber 13 unhindered, which represents a normal mode of operation for the transmission.

However, if the previously described necessity for a transmission adjustment during the standstill or idling occurs, which also involves corresponding input variables for the control unit 24, then the control unit 24 effects an adjustment of the reversing valve 65 to the other position shown in the drawing. As a result, the pressure chamber 13 is connected to a return flow line 67, which empties directly into the pressure medium supply container 21. The return flow line 67 without problems can have a large cross-sectional dimension, so that the pressure medium encounters practically no resistance during the discharge from the pressure chamber 13. In this way, it is possible to empty the pressure chamber 13 relatively quickly to change the transmission ratio, even if only the force of spring 28 is available. The flow-through resistance of the control valve 18, also shown in the discharge position in FIG. 1, is thus bridged.

Figure 12:
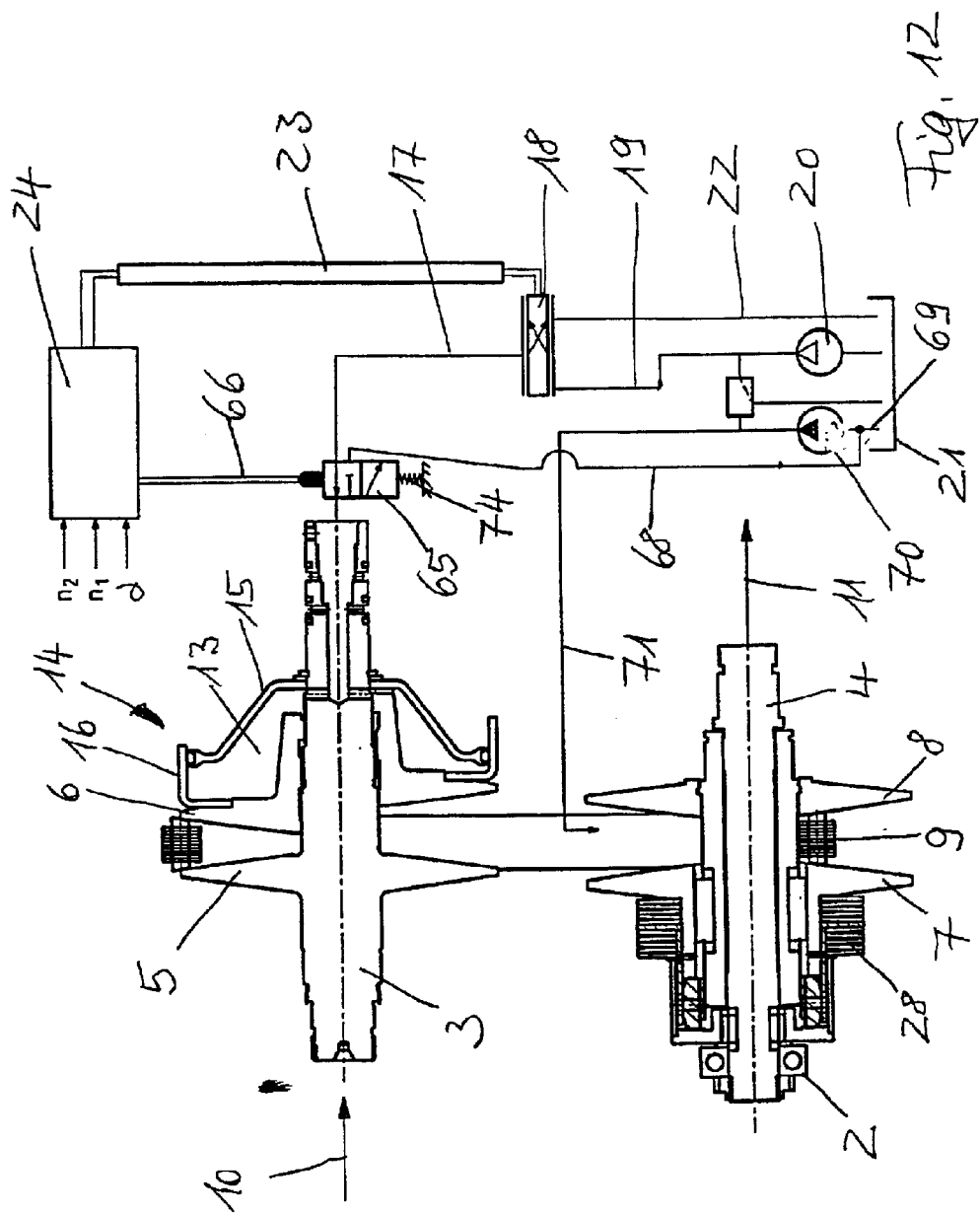
FIGS. 12 to 14 Show three modified versions of the hydraulic control shown in FIG. 1.

FIG. 12 shows a variant for this embodiment, described with the aid of FIG. 1. All components previously explained with the aid of FIG. 1 are given the same reference numbers and are not described again.

According to FIG. 12, the return flow line 68 of the reversing valve 65 is connected to the suction-in side 69 of a pump 70, which has a relatively low capacity because it generally is only used via a pressure line 71 for oiling the traction means 9. For the transmission adjustment in question, the connection between the pressure chamber 13 and the suction-in side of pump 70 nevertheless leads to a further increase in the discharge speed from the pressure chamber 13, as compared to the example described with the aid of FIG. 1. Consequently, the cone pulley 6 can move in axial direction away from the cone pulley 5.

Figure 13:
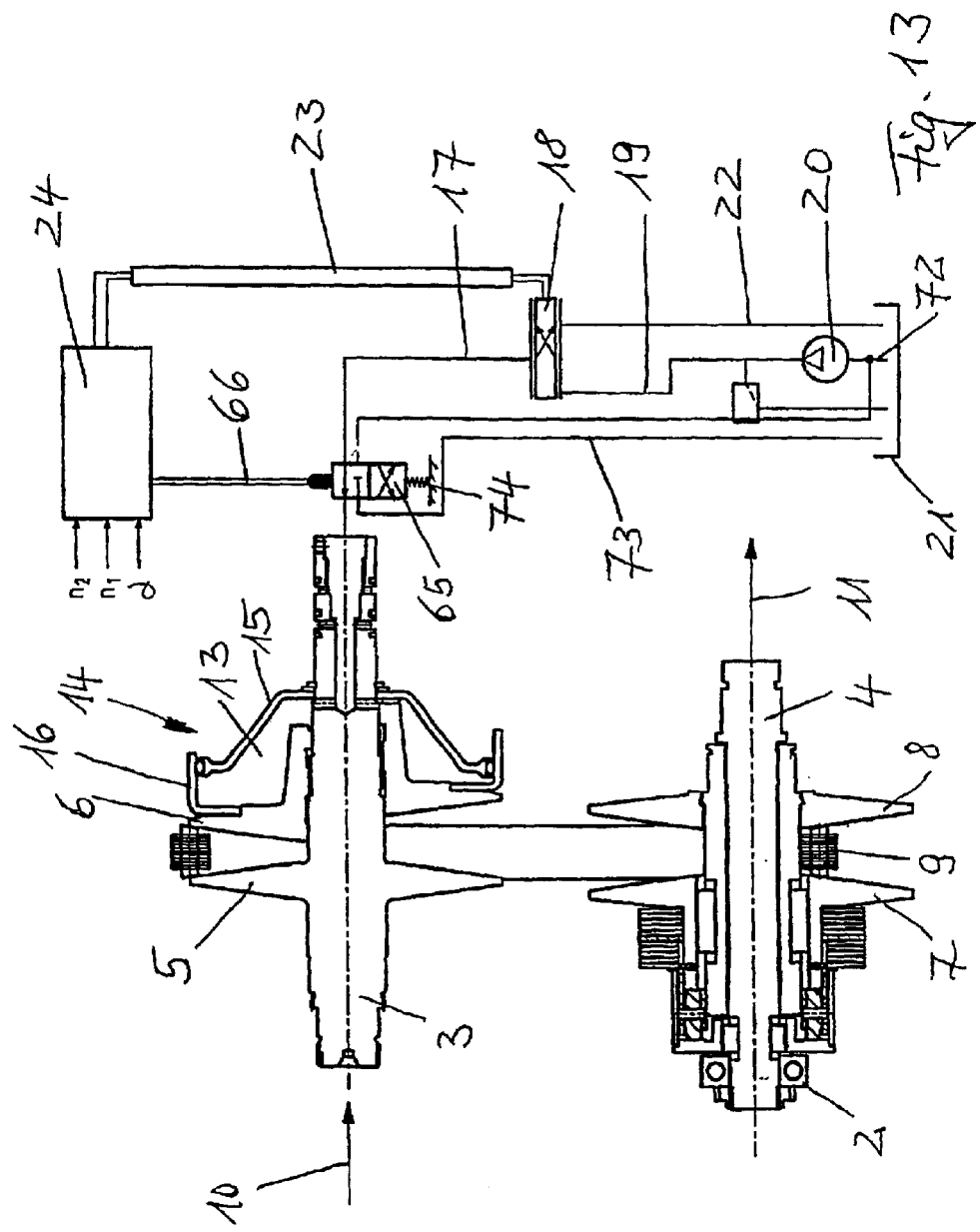

Another variant is shown in FIG. 13. For this example, the pressure chamber 13 is connected to the suction-in side 72 of pump 20 for the discharge. Since this pump has a relatively high capacity for supplying the pressure medium to maintain the transmission ratio, a correspondingly high suction capacity is also available on its suction-in side 72, thus further increasing the speed for emptying the pressure chamber 13.

FIG. 13 shows that when reversing the reversing valve 65, the pressure line 17 is simultaneously connected to a return flow line 73.

Figure 14:
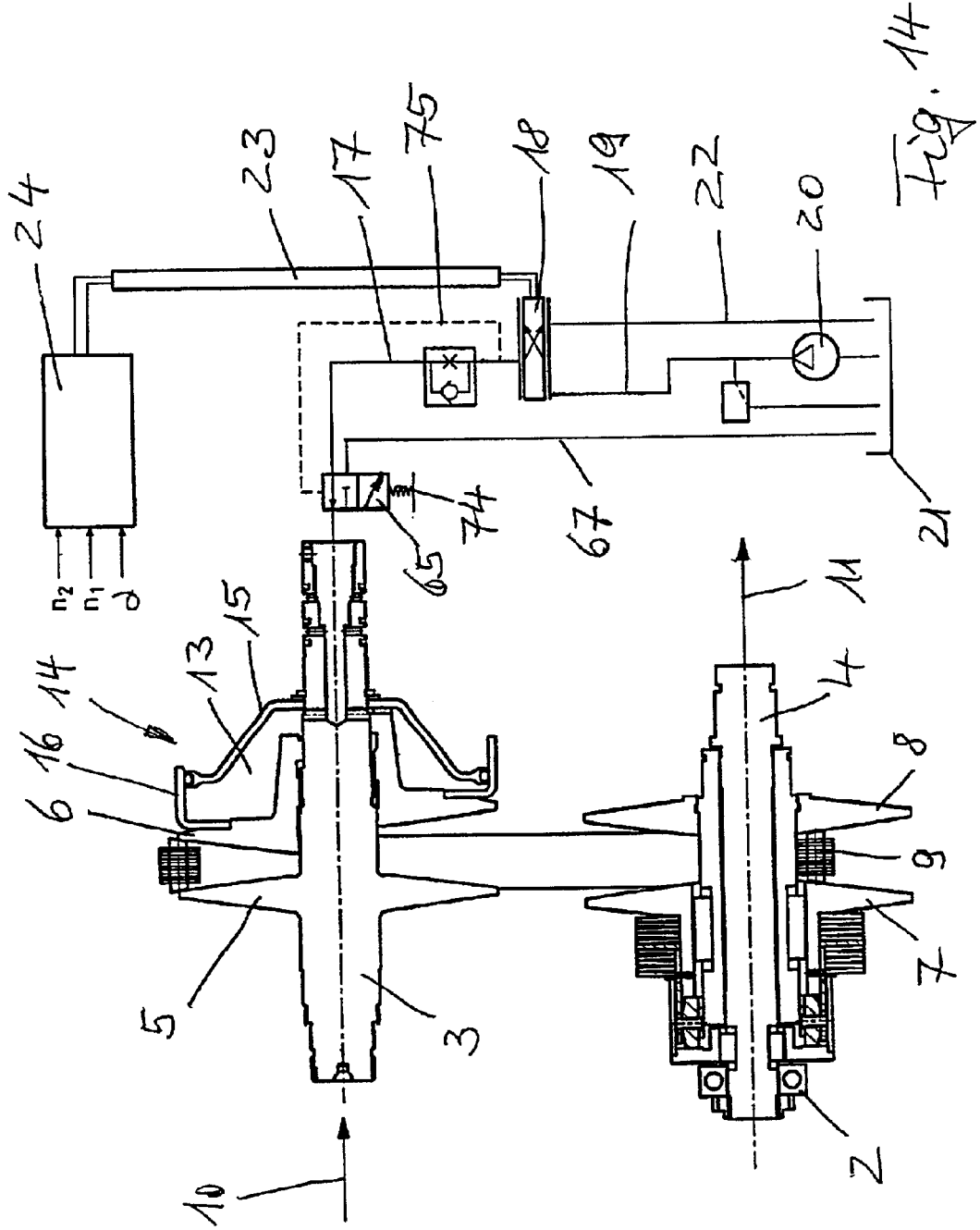

All three of the embodiments described with the aid of FIGS. 1, 12 and 13 also have in common that the reversing valve 65 must be activated by the control unit 24 and thus requires a certain expenditure for the activation. The design according to FIG. 14 is provided as an improved alternative. With this design, the pressure existing in the pressure line 17 is used via the line 75 to activate the control valve 65 from one side either counter to or under the effect of an adjustment spring 74.

Under normal operating conditions, the pressure exerted by the pressure medium and required for maintaining the transmission ratio, which must be channeled to the pressure chamber 13, is present in the pressure medium line 17.

Under this pressure, the reversing valve 65 is held in the position shown herein via the line 75 and counter to the effect of spring 74. In this position, the pressure medium can flow via the line 17 into the pressure chamber 13.

However, in case of an adjustment in the transmission ratio during the standstill or the idling, which requires emptying the pressure chamber 13, the control valve 18 position shown in the drawing is required, which is preset by the control unit 24 and for which the pressure line 17 is connected to the return flow line 22. As a result, the pressure line 17 practically has no pressure, which also applies to the line 75, so that the reversing valve 65 consequently can be changed to the alternative position under the effect of spring 74. In the process, the pressure chamber 13 is connected to the return flow line 67, so that the pressure medium advantageously can flow via a line with large cross section back to the pressure medium supply container 21.

What is claimed is:

1. An infinitely variable cone pulley transmission for generating of axial contact pressure forces upon a traction means, comprising:

an input side shaft and an output side shaft;

cone pulleys arranged on the input side and output side shafts, the traction means rotating between the cone pulleys;

means arranged on the transmission shafts, for exerting forces in axial direction upon respectively one cone pulley that can be displaced axially along the respective shaft, the exerting means including hydraulic tensioning means provided on input side shaft for adjusting and maintaining the transmission ratio and a spring supported tensioning means that is braced against a support, fixed relative to the output side shaft provided on the output side shaft, wherein the cone pulleys on the output side shaft include an axially fixed cone pulley and an axially movable cone pulley with an extended hub are jointly arranged on the output side shaft, wherein the cone pulleys on the input side and output side shafts are rotationally connected and jointly rotate on the respective shaft and are coupled to said the respective shaft and the exerting means exerts a contact pressure that depends on the rotational moment or the rotational moment and the transmission ratio, wherein the exerting means of the output side shafts includes a cam sleeve that is fixedly connected to the output side shaft, a cam sleeve formed by the free end of an extended hub and roll bodies for transmitting force, wherein said roll bodies are inserted between opposite arranged cam curves and rotate around roll body axes extending in radial direction, relative to the output side shaft, wherein the exerting means further includes rings for guiding and holding the roll bodies at a mutual distance to each other in the axial center region between the cam curves with the aid of a spring that is arranged coaxial on the extended hub, wherein the roll bodies include pinions that are coaxial to a rotational axes of the pinions and project in radial direction relative to the output side shaft from the roll bodies for engaging corresponding recesses, and wherein, in radial direction relative to the output side shaft, wherein the rings include a guide ring and a holding ring, the guide ring being in the form of a hollow-cylindrical sleeve is arranged outside of the roll bodies, wherein the guide ring encloses the roll bodies and the extended hub, and the guide ring can be displaced in axial direction along the extended hub, but is positioned such that the guide ring cannot rotate relative to the extended hub, wherein at least some of the pinions on the roll bodies are outward projecting and are positioned to rotate in circumferential slots of the guide ring that extend along a radial plane of the output side shaft, the slots having an axial width corresponding to the diameter of the pinions and are held in the region of the axial center between the cam sleeves, wherein, in circumferential direction, the length of the circumferential slots corresponds to at least half the maximum mutual circumferential path for the cam sleeves of the exerting means and wherein the guide ring has an end facing the axially movable cone pulley forming an extension onto the spring, such that moving in the same direction, the guide ring respectively traverses essentially half the axial distance traversed by the movable cone pulley.

2. A cone pulley transmission according to claim 1, wherein the spring is supported on one side on the axially movable cone pulley and on the other side on the cam sleeve that is fixedly connected to the output side shaft.

3. A cone pulley transmission according to claim 1, wherein the spring is a disk spring assembly, including one half which is arranged on the hub and the other half on the guide ring, wherein the spring is supported on the cam sleeve via a hollow-cylindrical intermediate segment that encircles the guide ring and wherein the guide ring has a radially outward pointing collar on one end that is captured between two halves of the disk spring assembly.

4. A cone pulley transmission according to claim 1, wherein the guide ring is provided with at least one groove that extends parallel to the axis of the output side shaft, wherein the hub includes a radial pin engaging the at least one groove to prevent rotation.

5. An infinitely variable cone pulley transmission for generating of axial contact pressure forces upon a traction means, comprising:

an input side shaft and an output side shaft;

cone pulleys arranged on the input side and output side shafts, the traction means rotating between the cone pulleys;

means arranged on the transmission shafts, for exerting forces in axial direction upon respectively one cone pulley that can be displaced axially along the respective shaft, the exerting means including hydraulic tensioning means provided on input side shaft for adjusting and maintaining the transmission ratio and a spring supported tensioning means that is braced against a support, fixed relative to the output side shaft provided on the output side shaft, wherein the cone pulleys on the output side shaft include an axially fixed cone pulley and an axially movable cone pulley with an extended hub are jointly arranged on the output side shaft, wherein the cone pulleys on the input side and output side shafts are rotationally connected and jointly rotate on the respective shaft and are coupled to said the respective shaft and the exerting means exerts a contact pressure that depends on the rotational moment or the rotational moment and the transmission ratio, wherein the exerting means of the output side shafts includes a cam sleeve that is fixedly connected to the output side shaft, a cam sleeve formed by the free end of an extended hub and roll bodies for transmitting force, wherein said roll bodies are inserted between opposite arranged cam curves and rotate around roll body axes extending in radial direction, relative to the output side shaft, wherein the exerting means further includes rings for guiding and holding the roll bodies at a mutual distance to each other in the axial center region between the cam curves with the aid of a spring that is arranged coaxial on the extended hub, wherein the roll bodies include pinions that are coaxial to a rotational axes of the pinions and project in radial direction relative to the output side shaft from the roll bodies for engaging corresponding recesses, and wherein, outside of the roll bodies and in radial direction relative to the output side shaft, wherein the rings include a guide ring that encompasses the roll bodies is arranged in the form of at least one assembly of axially side-by-side arranged, ring-shaped corrugated springs, having reciprocal undulations in axial direction along the circumference, wherein the guide ring is captured in axial direction between a rotating collar supported by the hub and a collar supported by the cam sleeve that is fixedly connected to the shaft and is kept axially centered relative to the exerting means and wherein at least some of the pinions on the roll bodies are radially outward projecting pinions positioned rotating in the axial center of said guide ring.

6. A cone pulley transmission according to claim 5, wherein the guide ring includes two identical corrugated spring assemblies, arranged axially side-by-side, wherein the corrugated springs of each assembly are braced against each other by undulation peaks that face each other and are fixedly connected, and wherein the pinions on the roll bodies are positioned so as to rotate between the corrugated spring assemblies.

7. A cone pulley transmission according to claim 6, wherein the rings include a holding ring arranged outside of the roll bodies, between the roll bodies and the guide ring of the corrugated springs, and wherein the holding ring is provided with a rotating collar that projects at the center radially outward from the holding ring and engages between the corrugated spring assemblies.

8. A cone pulley transmission according to claim 7, wherein the bores in the holding ring are designed to accommodate the pinions on the roll bodies and extend through the collar.

9. A cone pulley transmission according to claim 8, wherein an axial width of the collar corresponds to a width of the roll body pinions.

10. A one pulley transmission according to claim 7, wherein the axial width of the collar corresponds to the width of the roll body pinions.

11. A cone pulley transmission according to claim 6, wherein the spring is arranged on the hub and is braced against the axially movable cone pulley and the cam sleeve that is fixedly connected to the shaft with the aid of an essentially hollow-cylindrical intermediate segment that encompasses the guide ring.

12. A cone pulley transmission according to claim 11, wherein the collar supported by the cam sleeve fixed relative to the shaft and the intermediate segment are combined to form one component.

* * * * *